(12) United States Patent
Haefner et al.

(10) Patent No.: US 11,358,439 B2
(45) Date of Patent: Jun. 14, 2022

(54) FUEL CONNECTION UNIT

(71) Applicant: Eberspächer Climate Control Systems GmbH & Co. KG, Esslingen (DE)

(72) Inventors: Michael Haefner, Stuttgart (DE); Hans Jensen, Dettingen unter Teck (DE)

(73) Assignee: Eberspächer Climate Control Systems GmbH, Esslingen am Neckar (DE)

( * ) Notice: Subject to any disclaimer, the term of this patent is extended or adjusted under 35 U.S.C. 154(b) by 925 days.

(21) Appl. No.: 16/150,391

(22) Filed: Oct. 3, 2018

(65) Prior Publication Data
US 2019/0105965 A1 Apr. 11, 2019

(30) Foreign Application Priority Data
Oct. 5, 2017 (DE) ...................... 10 2017 123 046.7

(51) Int. Cl.
*B60H 1/22* (2006.01)
*F23K 5/02* (2006.01)

(52) U.S. Cl.
CPC ............. *B60H 1/2203* (2013.01); *F23K 5/02* (2013.01); *B60H 2001/2271* (2013.01); *B60H 2001/2284* (2013.01); *F23D 2900/21002* (2013.01); *F23K 2400/20* (2020.05); *F23N 2241/14* (2020.01)

(58) Field of Classification Search
None
See application file for complete search history.

(56) References Cited

U.S. PATENT DOCUMENTS

| | | | |
|---|---|---|---|
| 1,799,551 A | 4/1931 | Forney | |
| 2,290,298 A | 7/1942 | Spackman | |
| 3,849,055 A | 11/1974 | Stanley et al. | |
| 2003/0121691 A1* | 7/2003 | Inoue | F16L 37/0987 174/360 |
| 2011/0314827 A1 | 12/2011 | Khosla et al. | |
| 2016/0061444 A1* | 3/2016 | Haefner | F23D 14/46 431/159 |
| 2017/0267064 A1 | 9/2017 | Brandt et al. | |
| 2019/0001786 A1* | 1/2019 | Fin | F24H 9/06 |

FOREIGN PATENT DOCUMENTS

| | | |
|---|---|---|
| CN | 102 393 016 B | 12/2013 |
| DE | 31 36 839 A1 | 3/1983 |
| DE | 20 2004 015 442 U1 | 3/2006 |
| DE | 10 2016 107 207 A1 | 9/2017 |
| EP | 1 574 782 A2 | 9/2005 |
| JP | 3925170 A | 6/2007 |
| KR | 10-0830178 B1 | 5/2008 |
| KR | 20090042407 A | 4/2009 |
| KR | 20110016074 A | 2/2011 |
| KR | 10-1094882 B1 | 12/2011 |

* cited by examiner

*Primary Examiner* — Avinash A Savani
*Assistant Examiner* — Deepak A Deean
(74) *Attorney, Agent, or Firm* — McGlew and Tuttle, P.C.

(57) ABSTRACT

A fuel connection unit for a fuel-operated vehicle heater includes a connection unit body (12) to be mounted on a heater body (78). A fuel release line connection area (16) is positioned such that it meshes with or faces an interior (80) of the heater body (78). The fuel release line connection area (16) connects a fuel release line (104), extending in the interior (80), with a fuel feed line connection area (20) to be positioned exposed on an outer side of the heater body (78), for connecting a fuel feed line.

16 Claims, 6 Drawing Sheets

FUEL CONNECTION UNIT

CROSS REFERENCE TO RELATED APPLICATIONS

This application claims the benefit of priority under 35 U.S.C. § 119 of German Application 10 2017 123 046.7, filed Oct. 5, 2017, the entire contents of which are incorporated herein by reference.

TECHNICAL FIELD

The present invention pertains to a fuel connection unit for a fuel-operated vehicle heater.

BACKGROUND

A fuel-operated vehicle heater with a pot-shaped heater body is known from DE 20 2004 015 442 U1. The heater body encloses with a circumferential wall an interior, in which the burner area of the vehicle heater, to be fed with fuel, is arranged and is connected to the heater body. In a longitudinal section, the heater body provides a heat exchanger area, around which flows a combustion waste gas released from the burner area on its inner side and air to be heated on its outer side.

To feed fuel to the burner area, a fuel line is provided, which passes through the circumferential wall of the heater body, can be connected to a fuel feed line in an area located outside the heater body and is led with its area extending in the interior into the burner area and feeds liquid fuel into a porous evaporator medium.

SUMMARY OF THE INVENTION

An object of the present invention is to provide actions that make possible an easy-to-establish and reliably operating connection of a burner area of a fuel-operated vehicle heater to a fuel source.

This object is accomplished according to the present invention by a fuel connection unit for a fuel-operated vehicle heater, comprising a connection unit body to be arranged at a heater body with a fuel release line connection area, which is to be positioned such that it meshes with the interior of the heater body or faces same, for connecting a fuel release line extending in the interior and with a fuel feed line connection area, which extends in the interior and is to be positioned exposed on an outer side of the heater body for connecting a fuel feed line.

The fuel connection unit configured according to the present invention consequently provides essentially the area in which liquid fuel is led through a wall of a heater body. The fuel connection unit is then connected both in the interior of the heater body and on the outer side thereof via additional lines to be coupled with said fuel connection unit to the burner area, on the one hand, and to a fuel source, for example, a fuel tank or a feed pump delivering fuel from the fuel tank, on the other hand. The fuel connection unit can thus be configured optimally for its integration in the heater body, while the lines to be connected to it are configured optimally for its interaction with other system areas, especially with the burner area of a vehicle heater, or are provided in an already assembled state.

It is proposed for an easy-to-establish connection in the interior of a heater body that the fuel release line connection area comprise a release pipe projecting from the connection unit body.

To prevent the discharge of fuel in the interior, a connection formation may be provided at an end area of the release pipe, which said end area is located at a distance from the connection unit body, for the fluid-tight connection of a fuel release line to the release pipe.

The fluid-tight connection can be accomplished or established easily, in particular, by the connection formation comprising at least one sealing element, which is received in a release opening area of the release pipe and is connected to an inner circumferential surface of the release opening in a fluid-tight manner, with a sealing element insertion opening, or/and by the connection formation providing a funnel-shaped fuel release line insertion opening.

It is proposed for a configuration that can be embodied in a simple manner that the connection formation comprise an insertion element providing the funnel-shaped fuel release line and that the at least one sealing element be held in the release opening area by the insertion element.

The release pipe may be made in one piece with the connection unit body, preferably from a plastic material. This simplifies the configuration and reduces the number of components necessary for forming the fuel connection unit.

To make it possible to connect the fuel connection unit to a fuel line in a simple and reliable manner outside the heater body as well, it is proposed that the fuel feed line connection area comprise a feed pipe projecting from the connection unit body. The feed pipe and the release pipe preferably project here from the connection unit body in relation to one another in essentially opposite directions. The two pipes can thus be positioned optimally for the interaction with respective fuel lines to be connected to them.

To make it possible to uncouple the connection to fuel lines in the interior and outside the interior from one another in space, it is proposed that the feed pipe and the release pipe be offset in relation to one another essentially at right angles to a longitudinal axis of the feed pipe or/and to a longitudinal axis of the release pipe, wherein a connection duct, which connects a feed duct in the fed pipe to a release duct in the release pipe, is provided in the connection unit body.

For a configuration that can be manufactured in a simple manner and with a small number of components, the feed pipe may be made in one piece with the connection unit body, preferably from a plastic material.

In one variant, which is especially advantageous in applications with high requirements in terms of stability, the feed pipe may be formed separately from the connection unit body, preferably from a metallic material.

Provisions may be made in an alternative type of configuration for the connection of respective fuel lines to the fuel connection unit for the fuel feed line connection area or/and the fuel release line connection area to comprise a quick connection unit received in an opening of the connection unit body for connecting a fuel line to the connection unit body. A fuel line, which may possibly also have a flexible configuration, can then be inserted into such a quick connection unit and locked, in general, by clamping action.

To make it possible to provide a stable connection between the fuel connection unit and the heater body, which is stable especially before the mounting of a vehicle heater on a vehicle, at least one holding formation, preferably locking formation or clamping formation, may be provided at the connection unit body for holding the connection unit body at a heater body.

The present invention further pertains to a vehicle heater, comprising a heater body with a circumferential wall enclosing an interior, wherein a fuel connection unit mounting opening is provided in the circumferential wall and a fuel connection unit configured according to the present invention is received in the fuel connection unit mounting opening.

To establish a fluid-tight connection of the fuel connection unit to the heater body, provisions may advantageously be made for the fuel connection unit mounting opening to be fully closed in the circumferential direction of the opening.

For the fluid-tight connection of the fuel unit mounting opening the fuel connection unit may be received in the fuel connection unit mounting opening via the intermediary of at least one sealing element, which surrounds the connection unit body or/and at least one release pipe.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
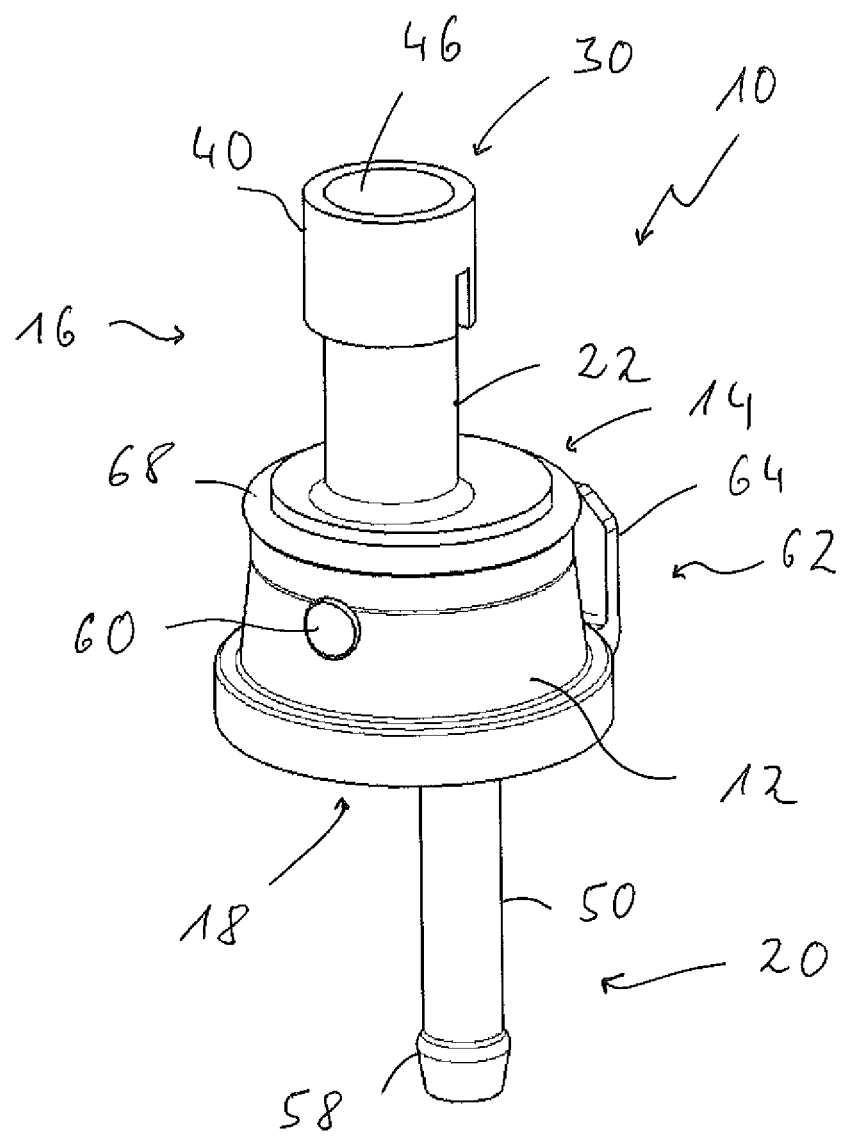
FIG. 1 is a perspective view of a fuel connection unit for a vehicle heater.
Figure 2:
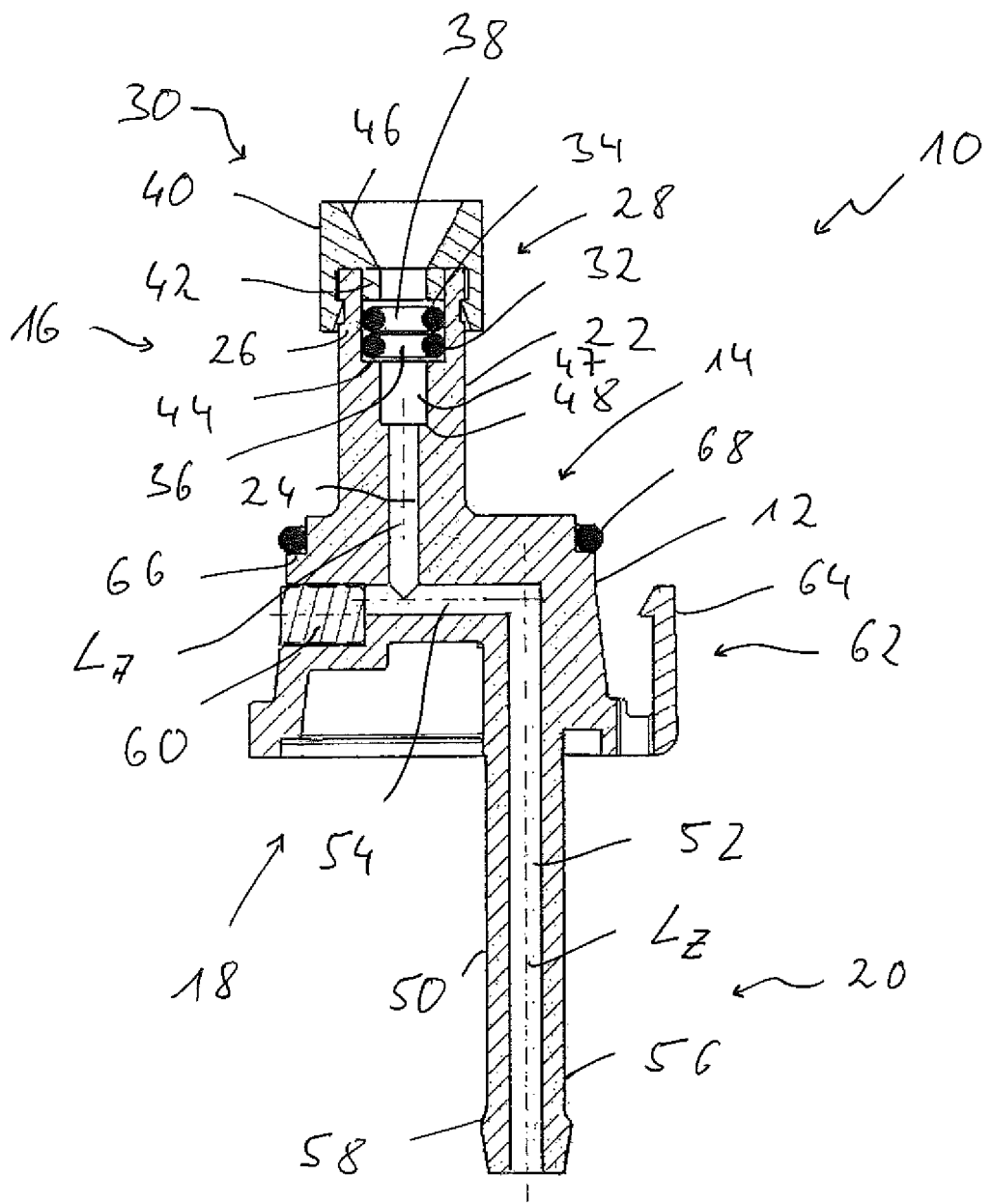
FIG. 2 is a longitudinal sectional view of a fuel connection unit according to FIG. 1.

Referring to the drawings, FIGS. 1 and 2 show a fuel connection unit 10 to be provided in a vehicle heater, which is to be operated with fuel and which may be used as a parking heater or auxiliary heater. The fuel connection unit 10 comprises a connection unit body 12, which has a disk-like configuration and with which the fuel connection unit 10 can be inserted into a fuel connection unit mounting opening of a heater body, which said mounting opening will be explained below. A fuel release line connection area generally designated by 16 is provided on an end face 14 of the connection unit body 12, which said end face is located at the top in FIGS. 1 and 2. With this fuel release connection area, the fuel connection unit 10 is to be positioned such that it meshes with an interior of a heater body in order to connect in this interior a fuel release line to the fuel connection unit.

A fuel feed line connection area 20 is provided on an end face 18 of the connection unit body 12, which said end face is positioned at the bottom in FIGS. 1 and 2. This fuel feed line connection area is located outside the vehicle heater when the fuel connection unit 10 is mounted on a heater body of a vehicle heater, and is provided for connecting a fuel feed line, via which liquid fuel can be fed, for example, by a feed pump from a fuel tank.

The fuel release line connection area 16 comprises a release pipe 22 extending away from the connection unit body 12. A release duct 24, which is open in an end area 26 of the release pipe 22, which said end area is located at a distance from the connection unit body 12, is provided in a release opening area 28. The release duct 24 expands, for example, it a stepwise manner in the release opening area 28.

A connection formation generally designated by 30 is provided at the release opening area 28. A fuel release line, configured, for example, as a metal pipe, may be connected to the fuel connection unit 10 via this connection formation 30. In the exemplary embodiment shown, the connection formation 30 comprises two sealing elements 32, 34 having, for example, an O-ring-like configuration, each with a sealing element insertion opening 36, 38, into which the fuel release line can be inserted such that the sealing elements 32, 34 are in fluid-tight contact in their outer circumferential areas with an inner circumferential surface of the release opening area 28 and of the release duct 24, respectively, and they are in fluid-tight contact with their inner circumferential areas with the outer circumferential surface of the fuel release line. To facilitate the insertion of the fuel release line into the two sealing elements 32, 34, these may be separated, for example, by a ring-shaped separating disk positioned between them.

The connection formation 30 further comprises an insertion element 40, which is placed on the end area 26 of the release pipe 22 and is held thereon, for example, by locking. With a section 42 meshing with the end area 26, the insertion element 40 holds the two sealing elements 32, 34 in the release opening area 28 such that these sealing elements 32, 34 are positioned between the section 42 of the insertion element 40 and a step-like expansion 44 of the release duct 24. The insertion element 40 provides a funnel-shaped fuel release line insertion opening 46, which facilitates the insertion of the fuel release line, on the one hand, and ensures, on the other hand, that this line is guided or positioned in the course of the insertion motion such that it can enter the sealing element insertion openings 36, 38 provided by the sealing elements 32, 34, without damaging the sealing elements 32, 34. In an area 47 of the release duct 24, which area adjoins the step-like expansion, the release duct 24 is dimensioned such that after passing through the two sealing elements 32, 34, the fuel release line can be received in them. The step-like expansion 48 may form an insertion edge for the fuel release line, so that it is guaranteed that this line will not be inserted too far into the release pipe 22 and is held in a defined position therein.

The fuel feed line connection area 20 provided on the end face 18 comprises a feed pipe 50. The feed pipe 50 extends from the connection unit body 12 in a direction essentially opposite the direction in which the release pipe 22 extends and has a feed duct 52. As can clearly be seen in FIG. 2, the release pipe 22 and the feed pipe 50 are positioned such that they are offset essentially at right angles to their respective longitudinal axes LA and LZ, but extend basically essentially parallel to each other. To establish a connection between the feed duct 52 and the release duct 24, a connection duct 54, which, extending essentially at right angles to the feed duct 52 and the release duct 24, connects these two ducts to one another in their respective end areas that are located close to one another, is formed in the connection unit body 12. In the end area 56 located at a distance from the connection unit body 12, the feed pipe 50 has a, for example, bead-like expansion 58, over which a fuel feed line, for example, a flexible hose line, can be pushed, in order to fix this hose line at the fuel feed pipe 50 and to connect this thereto the fuel feed pipe. A pipe clamp or a similar fastening element may be used to prevent the fuel feed line from separating from the feed pipe 50.

In the embodiment of the fuel connection unit 10 shown in FIG. 2, the connection unit body 12 is made in one piece, i.e., as a material block, with the release pipe 22 and with the feed pipe 50. This unit is preferably manufactured from a plastic material according to a casting process. To make it possible to prepare the release duct 24, the feed duct 52 and the connection duct 54 by means of corresponding mold cores, but also to remove these cores after the casting operation, the connection duct 54 is also configured as a duct that is basically open towards an outer circumferential area of the connection unit body 12 and is closed in this area by a closing element 60 closing the connection duct 54 in a fluid-tight manner. The closing element 60, which is likewise made, for example, of a plastic material, may be pressed into a, for example, expanded end area of the connection duct 54 and thus held firmly therein. Instead of the use of a closing element, the connection duct 54 may also be closed tightly by a welded closure in its end area towards the outer circumference of the connection unit body 12.

A holding formation, generally designated by 62, is formed on the connection unit body 12. This holding formation comprises in a circumferential area of the connection unit body 12 a locking tongue 64, which can interact, as will be described below, with a corresponding formation on a heater body in order to hold the fuel connection unit 10 at the heater body. Furthermore, a step-like shoulder 66, in which the connection unit body 12 is surrounded by a ring-shaped sealing element 68, is formed at the connection unit body 12 close to the end face 14, i.e., to an end face to be positioned facing an interior of a heater body. With the fuel connection unit 10 mounted on a heater body, the sealing element 68 ensures a sealed connection of the connection unit body 12 to the heater body especially against the discharge of gas from the interior.

Figure 3:
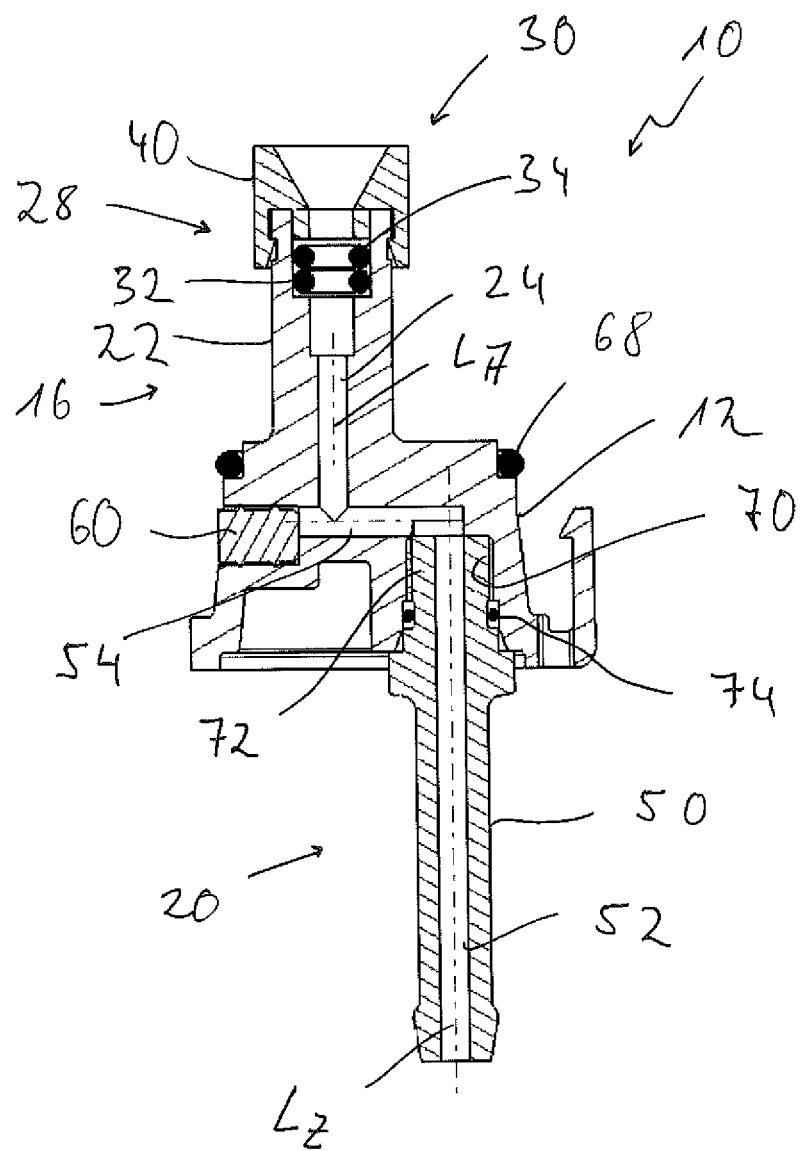
FIG. 3 is a longitudinal sectional view, corresponding to FIG. 2, of an alternative type of configuration of the fuel connection unit.

FIG. 3 shows a variant of the type of configuration of the fuel connection unit 10 shown in FIG. 2. It is seen that the feed pipe 50 forming essentially the fuel feed line connection area 20 is not made in one piece with the connection unit body 12, but is formed by a separate component. An opening 70, which is provided, for example, with internal thread, and into which an end area 72 of the feed pipe 50, which said end area 72 is provided, for example, with external thread, is inserted or screwed in case of a threaded configuration. To guarantee a fluid-tight connection, the end area 72 is surrounded, for example, adjacent to the external thread provided there, with an O-ring-like sealing element 74, which is in contact with the outer circumference of the end area 72 of the feed pipe 50, on the one hand, and with the inner surface of the opening 70 in the connection unit body 12, on the other hand, and thus generates a sealing effect.

To prevent the separation of the feed pipe configured as a separate component, this pipe may be screwed into the opening 70 so tightly that a clamping effect guaranteeing stable holding is generated. In addition, separation can be prevented by bonding the feed pipe 50 to the connection unit body 12. In case of a threadless configuration, the feed pipe 50 can be pressed with its end area 72 into the opening 70 and thus held, also supported, for example, by the adhesive effect of an adhesive, in the connection unit body 12 in a stable manner.

It is possible in the type of configuration of a fuel connection unit 10 shown in FIG. 3 to use different materials to manufacture the feed pipe 50, on the one hand, and the connection unit body 12, on the other hand. While the connection unit body 12 can be manufactured from a plastic material in a casting process, for example, with the release pipe 22 made in one piece with it, the feed pipe 50 may be made of a metallic material, for example, an aluminum material. Such a configuration is especially advantageous where the generation of forces or/and vibrations acting, for example, on a fuel feed line calls for a special stability of the fuel connection unit 10.

The integration of such a fuel connection unit 10 in a vehicle heater will be described below with reference to FIGS. 4 through 7. This applies to both embodiments of the fuel connection unit 10, which are shown in FIGS. 2 and 3 and have basically identical dimensions.

Figure 4:
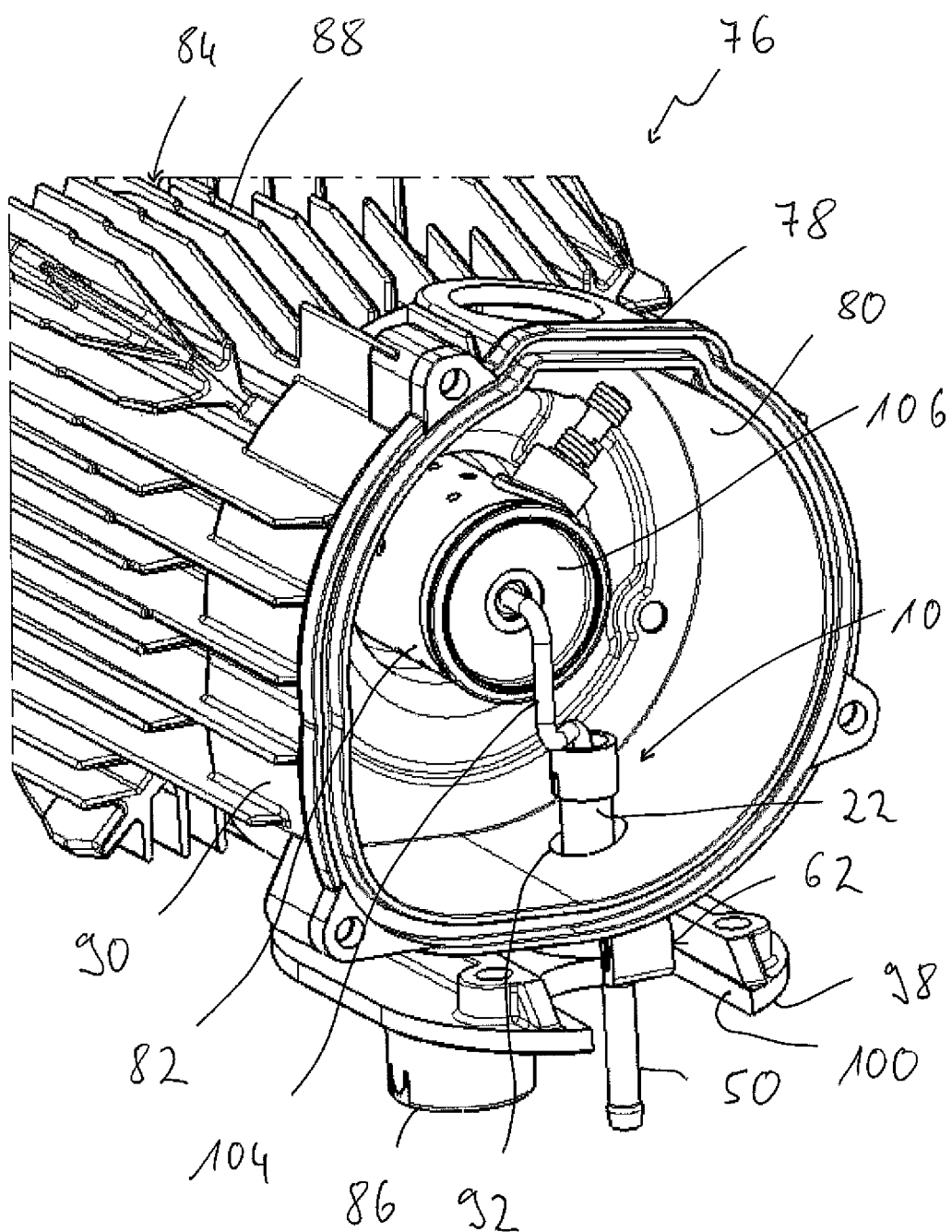
FIG. 4 is a partial perspective view of a vehicle heater equipped with a fuel unit.

FIG. 4 shows a partial area of a vehicle heater 76 to be operated with fuel. The fuel-operated vehicle heater 76 comprises a heater body generally designated by 78. This provides, in an end area, which is open axially in relation to a central longitudinal axis of the heater body 78, an interior 80, into which a combustion chamber assembly unit generally designated by 82 is inserted. The air necessary for the combustion is delivered into the interior 80 and hence, via this, to the combustion chamber assembly unit 82, via a combustion air blower 80, which closes the interior 80 axially and is shown in some areas in FIG. 5 and is configured, for example, as a side channel blower. In a section shown in the left-hand area in FIG. 4, the heater body 78 forms a heat exchanger unit 86, around the inner side of which exhaust gas released via an exhaust gas outlet pipe 86 flows and around the outer side of which air to be heated flows in the area of heat transfer ribs 88 provided there.

Figure 5:
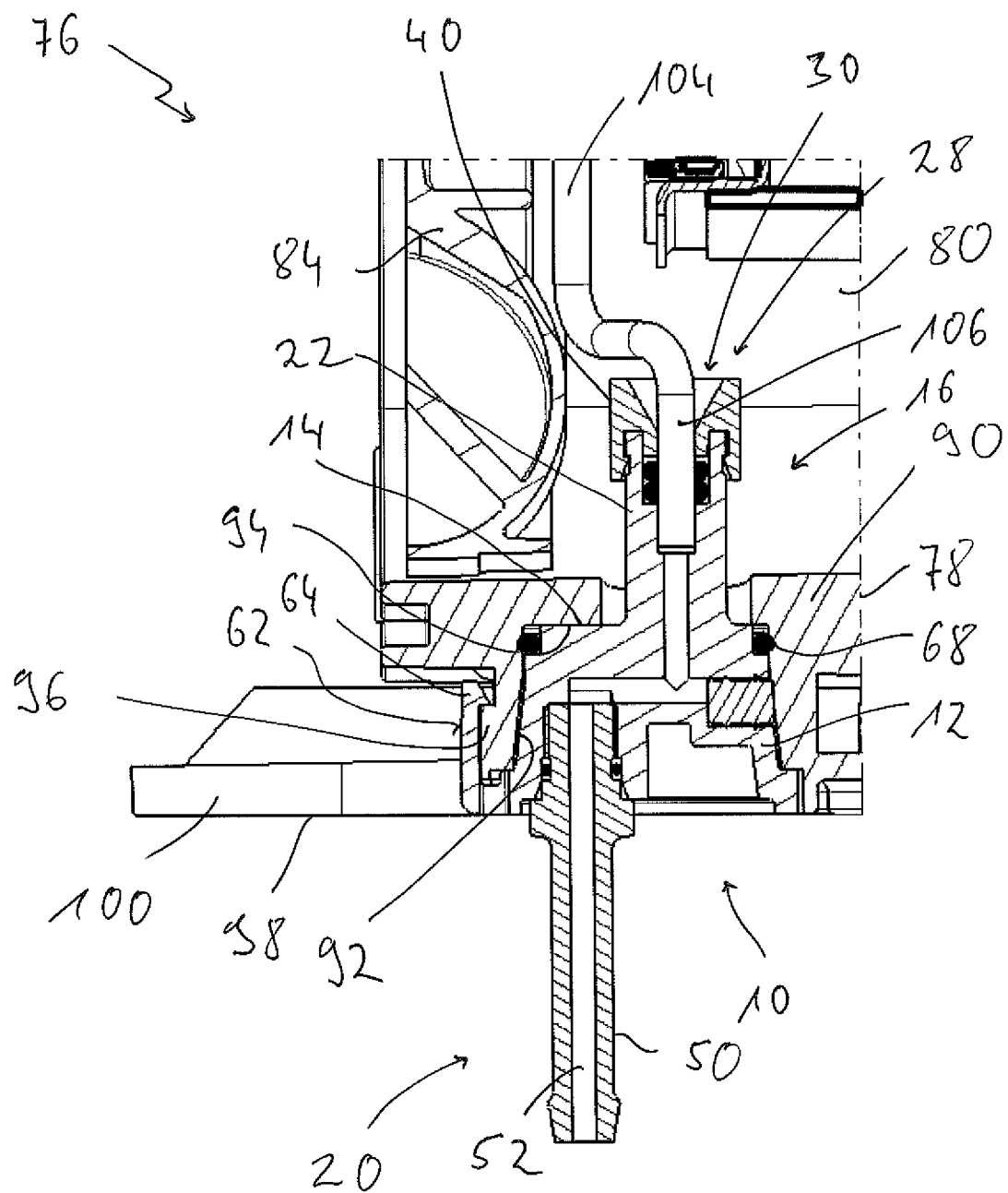
FIG. 5 is a partial longitudinal sectional view of the vehicle heater according to FIG. 4.
Figure 6:
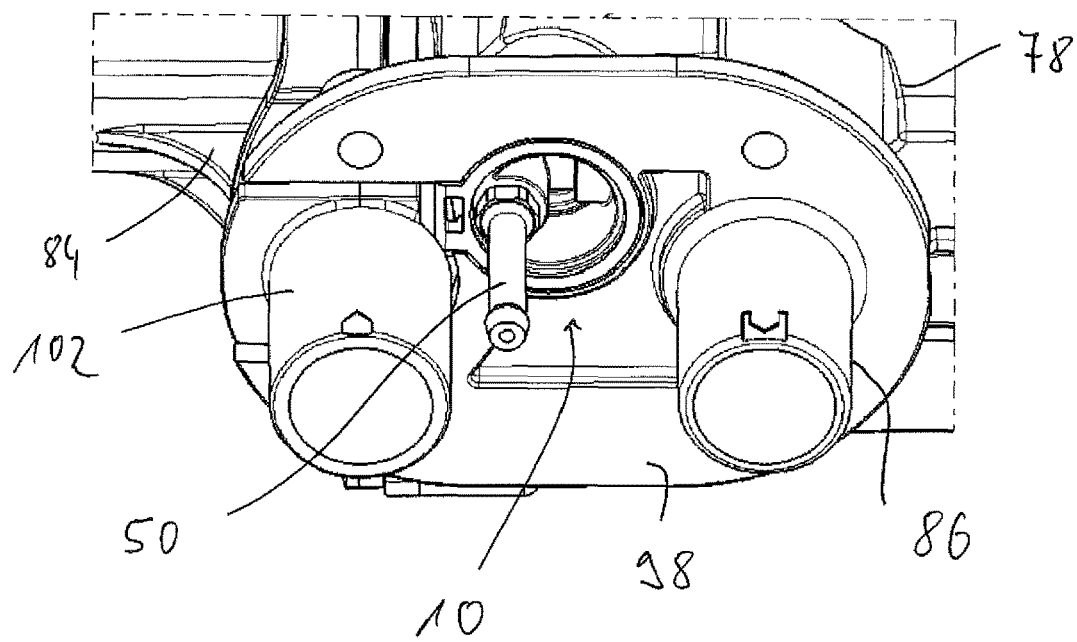
FIG. 6 is a partial perspective view of the vehicle heater according to FIG. 4.
Figure 7:
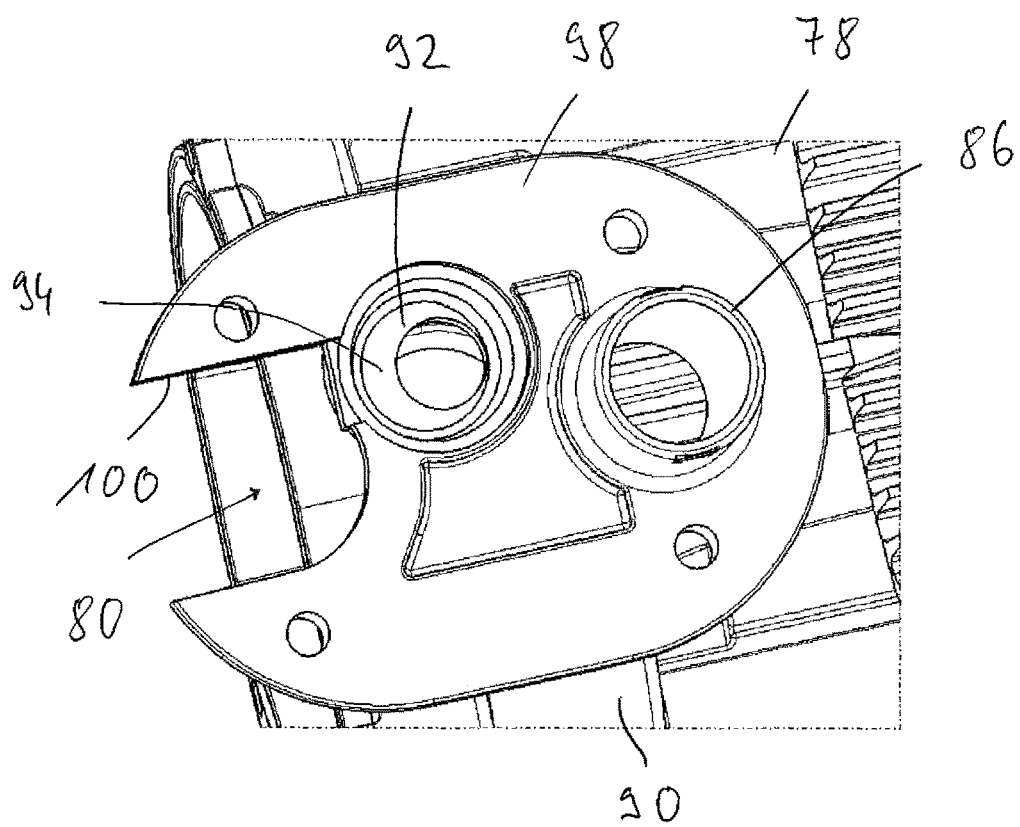
FIG. 7 is another partial perspective view of the vehicle heater according to FIG. 4 with the fuel connection unit not mounted and with a combustion air blower not mounted.

A fuel connection unit mounting opening 92, which can be clearly seen in FIG. 5 and FIG. 7, is formed in the circumferential wall 90 of the heater body 78, which circumferential wall surrounds the interior 80. The fuel connection unit mounting opening 92 is shaped and dimensioned such that the connection unit body 12 can be received therein with close fit and the sealing element 68 is in contact with an inner surface of the fuel connection unit mounting opening 92 to establish a connection that is sealed against the discharge of gas. With the connection unit body 12 fully inserted into the fuel mounting opening 92, this connection unit body is in contact by its end face 14 with a bottom area 94 of the fuel connection unit mounting opening 92. The locking tongue 64 overlaps in this state a complementary formation 96 on the heater body 78, so that the fuel connection unit 10 is held by locking meshing in a defined position at the heater body 78.

It is seen in FIGS. 4 through 7 that a plate-shaped mounting area 98, with which the vehicle heater 76 or the heater body 78 can be mounted on a carrier area in a vehicle, is formed on the heater body 78 in the area of the circumferential wall 90, in which the fuel connection unit mounting opening 92 is formed. The fuel connection unit mounting opening 92 passes through the plate-shaped mounting area 98 and forms in this an opening, which is closed in the circumferential direction, so that a fluid-tight, and especially also gas-tight connection is guaranteed by the sealing element 68 over the entire circumference. Furthermore, the exhaust gas release pipe 86, which is preferably configured integrally with the heater body 78, is provided in the area of the plate-shaped mounting area 98, and a laterally open recess 100 is also provided, and a combustion air feed pipe 102 of the blower 84 can be positioned such that it meshes with said recess 100 when the blower 84 is mounted on the heater body 78.

The exhaust gas release pipe 86 and the combustion air feed pipe 102 define an interface, with which the vehicle heater 76 is brought into connection with a complementarily shaped interface on a carrier, which is a rigid part of the vehicle. Part of this complementary interface may also be a fuel feed line, so that by mounting the fuel connection unit 10 on the heater body 78 in a defined position, the fuel feed line connection area 20, especially the feed pipe 50 thereof, can also assume a defined relative position in relation to the exhaust gas release pipe 86 and to the combustion air feed pipe 102.

FIG. 5 shows clearly that with the fuel connection unit 10 mounted on the heater body 78, the fuel release line connection area 16 is positioned in the interior 80. A fuel release line 104, which is configured, for example, as a metal pipe and may be permanently connected to the combustion chamber assembly unit 82 and feeds liquid fuel, for example, into a porous evaporator medium in its end area located in the combustion chamber assembly unit 82, extends in this interior 80. The fuel release line 104, which is led out of the combustion chamber assembly unity 82, for example, in a bottom area 106, is shaped and dimensioned such that the fuel release line 104 ends at a distance from an inner surface of the circumferential wall 90 of the heater body 78 when the combustion chamber assembly unit 82 is mounted on the heater body 78. This means that the combustion chamber assembly unit 82 with the fuel release line 104 provided thereon can be inserted into the heater body 78 without the fuel release line 104 and the circumferential wall 90 mutually interfering with each other. With the combustion chamber assembly unit 82 mounted on the heater body 78, the fuel release line 104 is positioned such that its end area 106, which is to be connected to the fuel connection unit 10, is positioned in the area in which the release pipe 22 with its release opening area 28 is positioned when the fuel connection unit 10 is inserted into the fuel connection unit mounting opening 92. When mounting the fuel connection unit 10, it is inserted into the fuel connection unit mounting opening 92 such that in the course of the motion necessary for this, the end area 106 of the fuel release line 104 enters the release opening area 28 via the funnel-shaped fuel release line insertion opening 46 and is passed in the process through the sealing element insertion openings 36, 38 provided in the sealing elements 32, 34. With the end face 14 of the connection unit body 12 seated on the bottom area 94 of the fuel connection unit mounting opening 92, the end area 106 of the fuel release line 104 is located at a short distance in front of or at the step-like expansion 48 of the release duct 24.

After insertion of the fuel connection unit 10 into the fuel connection unit mounting opening 92, the release pipe 22 and the feed pipe 50 are positioned such that a mutual interference of the release pipe 22 and the blower 84 is avoided, but, on the other hand, the feed pipe 50 offset in relation to the release pipe 22 is in a position necessary for forming the above-mentioned interface on the outer side of the heater body 78. The fuel connection unit 10 is held in this state by the holding formation 62 on the heater body 78. If the vehicle heater 76 thus equipped with the fuel connection unit 10 is mounted with its plate-shaped mounting area 98 on a complementarily shaped carrier on a vehicle, the fuel connection unit 10 is held permanently between the bottom area 94 of the fuel connection unit mounting area 92 and the carrier, which is in contact with the plate-shaped mounting area 98 and is a rigid part of the vehicle, in addition to the holding effect provided by the holding formation 62. Separation of the fuel connection unit 10 is completely prevented.

In an alternative type of configuration, at least the fuel feed line connection area configured and provided for connecting a fuel feed line could comprise, instead of a pipe shown in the figures, a quick connection unit, which is inserted into the opening 70 of the connection unit body 12, which opening can be seen in FIG. 3, and into which opening a fuel feed line having a tubular or hose-like configuration is inserted and in which it is locked by clamping effect. Further, the sealing element 68 providing the tight connection of the fuel connection unit 10 to the heater body 78 could be arranged in an alternative embodiment such that it surrounds the release pipe 22 and it could interact there with the circumferential wall 90 to establish the tight connection.

While specific embodiments of the invention have been shown and described in detail to illustrate the application of the principles of the invention, it will be understood that the invention may be embodied otherwise without departing from such principles.

What is claimed is:

1. A fuel connection unit for a fuel-operated vehicle heater, the fuel connection unit comprising:
    a connection unit body to be mounted on a heater body;
    a fuel release line connection area, which is configured to be positioned to mesh with or face an interior of the heater body, for connecting a fuel release line extending in the interior of the heater body;
    a fuel feed line connection area to be positioned exposed on an outer side of the heater body for connecting a fuel feed line;
    wherein the fuel release line connection area comprises a release pipe projecting from the connection unit body;
    wherein a connection formation is provided on an end area of the release pipe for a fluid-tight connection of a fuel release line to the release pipe;
    wherein the end area is located at a distance from the connection unit body;
    wherein the connection formation comprises at least one sealing element with a sealing element insertion opening;
    wherein the at least one sealing element is received in a release opening area of the release pipe and is connected in a fluid-tight connection to an inner circumferential surface of the release opening area and the connection formation provides a funnel-shaped fuel release line opening;
    wherein the connection formation comprises an insertion element providing the funnel-shaped fuel release line insertion opening; and
    wherein the at least one sealing element is held by the insertion element in the release opening area.

2. The fuel connection unit in accordance with claim 1, wherein the release pipe is made in one piece with the connection unit body from a plastic material.

3. The fuel connection unit in accordance with claim 1, wherein the fuel feed line connection area comprises a feed pipe projecting from the connection unit body.

4. The fuel connection unit in accordance with claim 1, wherein:
    the fuel feed line connection area comprises a feed pipe projecting from the connection unit body; and
    the feed pipe and the release pipe project from the connection unit body in relation to one another in essentially opposite directions.

5. The fuel connection unit in accordance with claim 1, wherein the fuel feed line connection area comprises a feed pipe projecting from the connection unit body;

the feed pipe and the release pipe are offset in relation to one another essentially at right angles to a longitudinal axis of the feed pipe and/or a longitudinal axis of the release pipe; and a connection duct connecting a feed duct in the feed pipe to a release duct in the release pipe is provided in the connection unit body.

6. The fuel connection unit in accordance with claim 3, wherein the feed pipe is made in one piece with the connection unit body from a plastic material.

7. The fuel connection unit in accordance with claim 3, wherein the feed pipe is made separately from the connection unit body from a metallic material.

8. The fuel connection unit in accordance with claim 1, wherein the fuel feed line connection area or/and the fuel release line connection area comprises a quick connection unit received in an opening of the connection unit body for connecting a fuel line to the connection unit body.

9. The fuel connection unit in accordance with claim 1, wherein at least one holding formation comprising a locking formation or clamping formation, is provided on the connection unit body for holding the connection unit body at a heater body.

10. A vehicle heater comprising:
a heater body comprising a circumferential wall enclosing an interior with a fuel connection unit mounting opening provided in the circumferential wall; and
a fuel connection unit received in the fuel connection unit mounting opening, the fuel connection unit comprising:
a connection unit body to be mounted on a heater body;
a fuel release line connection area, which is configured to be positioned to mesh with or face an interior of the heater body, for connecting a fuel release line extending in the interior of the heater body;
a fuel feed line connection area to be positioned exposed on an outer side of the heater body for connecting a fuel feed line,
wherein:
the fuel release line connection area comprises a release pipe projecting from the connection unit body;
a connection formation is provided on an end area of the release pipe for a fluid-tight connection of a fuel release line to the release pipe; and
the end area is located at a distance from the connection unit body, wherein:
the connection formation comprises at least one sealing element with a sealing element insertion opening; and
the at least one sealing element is received in a release opening area of the release pipe and is connected in a fluid-tight connection to an inner circumferential surface of the release opening area and the connection formation provides a funnel-shaped fuel release line opening,
wherein:
the connection formation comprises an insertion element providing the funnel-shaped fuel release line insertion opening; and
the at least one sealing element is held by the insertion element in the release opening area.

11. The vehicle heater in accordance with claim 10, wherein the fuel connection unit mounting opening is fully closed in the circumferential direction of the fuel connection unit mounting opening.

12. The vehicle heater in accordance with claim 11, further comprising at least one sealing element, wherein the fuel connection unit is received in the fuel connection unit mounting opening via the at least one sealing element as an intermediary surrounding the connection unit body or/and the at least one sealing element surrounding a release pipe.

13. The vehicle heater in accordance with claim 10, wherein:
the fuel feed line connection area comprises a feed pipe projecting from the connection unit body;
the feed pipe and the release pipe project from the connection unit body in relation to one another in essentially opposite directions;
the feed pipe and the release pipe are offset in relation to one another essentially at right angles to a longitudinal axis of the feed pipe and/or a longitudinal axis of the release pipe; and
a connection duct connecting a feed duct in the feed pipe to a release duct in the release pipe is provided in the connection unit body.

14. A fuel connection unit for a fuel-operated vehicle heater, the fuel connection unit comprising:
a connection unit body to be mounted on a heater body;
a fuel release line connection area, which is configured to be positioned to mesh with or face an interior of the heater body, for connecting to a fuel release line extending in the interior of the heater body;
a fuel feed line connection area to be positioned exposed on an outer side of the heater body for connecting a fuel feed line;
the fuel release line connection area comprising a release pipe projecting from the connection unit body, the release pipe having an end area defining a release opening area having an inner circumferential surface, the end area being located at a distance from the connection unit body;
a connection formation provided on an end area of the release pipe for a fluid-tight connection of a fuel release line to the release pipe, the connection formation comprising a sealing element with a sealing element insertion opening, the connection formation comprising an insertion element providing a funnel-shaped fuel release line opening;
the sealing element being received in the release opening area of the release pipe and being connected in a fluid-tight connection to the inner circumferential surface of the release opening area;
the insertion element having a section arranged inside the inner circumferential surface of the release opening area.

15. A fuel connection unit in accordance with claim 14, wherein:
the section of the insertion element meshes with the end area of the release pipe.

16. A fuel connection unit in accordance with claim 14, wherein:
the section of the insertion element blocks movement of the sealing element out of the release opening end area and out of connection to the inner circumferential surface of the release opening area.

* * * * *